United States Patent
Jan et al.

(10) Patent No.: US 6,985,183 B2
(45) Date of Patent: Jan. 10, 2006

(54) METHOD FOR EXPLORING VIEWPOINT AND FOCAL LENGTH OF CAMERA

(75) Inventors: Gwo-Jen Jan, Taipei (TW); Chuang-Jan Chang, Taipei (TW)

(73) Assignee: APPRO Technology Inc., HsinChuan (TW)

( * ) Notice: Subject to any disclaimer, the term of this patent is extended or adjusted under 35 U.S.C. 154(b) by 920 days.

(21) Appl. No.: 09/981,942

(22) Filed: Oct. 19, 2001

(65) Prior Publication Data

US 2003/0090586 A1    May 15, 2003

(51) Int. Cl.
H04N 5/225    (2006.01)
H04N 17/02   (2006.01)
H04N 7/00    (2006.01)
G02B 3/00    (2006.01)
G01B 11/02   (2006.01)

(52) U.S. Cl. .................. 348/335; 348/36; 348/188; 359/662; 356/515; 356/127

(58) Field of Classification Search .............. 348/36, 348/37, 38, 39, 188, 335, 340, 360; 359/662, 359/664, 720; 356/515, 125, 127, 126, 603, 356/604, 606, 610, 611
See application file for complete search history.

(56) References Cited

U.S. PATENT DOCUMENTS

| 3,574,464 A | * | 4/1971 | Howland ............... 356/126 |
|---|---|---|---|
| 5,185,667 A | | 2/1993 | Zimmermann |
| 5,313,306 A | | 5/1994 | Kuban et al. |
| 5,359,363 A | | 10/1994 | Kuban et al. |
| 5,384,588 A | | 1/1995 | Martin et al. |
| 5,764,276 A | | 6/1998 | Martin et al. |
| 5,877,801 A | | 3/1999 | Martin et al. |
| 5,903,319 A | | 5/1999 | Busko et al. |

(Continued)

FOREIGN PATENT DOCUMENTS

EP    1028389 A2 *  8/2000

(Continued)

OTHER PUBLICATIONS

Xiong et al.; "Creating Image-Based VR Using a Self-Calibrating Fisheye Lens"; 1997 IEEE Computer Society Conference on Computer Vision and Pattern Recognition; Jun. 17-19, 1997; pp. 237-243.*

(Continued)

*Primary Examiner*—Aung Moe
*Assistant Examiner*—John M. Villecco
(74) *Attorney, Agent, or Firm*—Birch, Stewart, Kolasch & Birch, LLP

(57) ABSTRACT

The present invention is a method for exploring the viewpoint and focal length of a fisheye lens camera (FELC). It employs the characteristic of the central symmetry of the distortion of the fisheye lens (FEL) to set its optic axis by means of a calibration target with a plurality of symmetrically homocentric figures. Once the optic axis is fixed, further disclose the viewpoint (VP) of the FELC along the optic axis through a trail-and-error procedure and calculate its effective focal length and classify it to the primitive projection mode. Because the invention is capable of finding out both the internal and external parameters of the FELC and the calibration method is easy, low-cost, suitable to any projection model, and has greater sensitivity corresponding to an increasing in image distortion, the distortive images can be transformed easily to normal ones which fit in with a central perspective mechanism. Furthermore, the invention is also practicable and excellent in its applications in the fields of quality identification of the FEL and wide-view 3-D metering.

21 Claims, 7 Drawing Sheets

U.S. PATENT DOCUMENTS

| | | | |
|---|---|---|---|
| 5,990,941 A | 11/1999 | Jackson et al. | |
| 6,002,430 A | 12/1999 | McCall et al. | |
| 6,147,709 A | 11/2000 | Martin et al. | |
| 6,201,574 B1 | 3/2001 | Martin | |
| 6,574,376 B1 * | 6/2003 | Shiota et al. | 382/293 |
| 6,754,400 B2 * | 6/2004 | Florin et al. | 382/285 |
| 6,795,113 B1 * | 9/2004 | Jackson et al. | 348/36 |
| 6,833,843 B2 * | 12/2004 | Mojaver et al. | 345/647 |
| 2004/0046888 A1 * | 3/2004 | Jan et al. | 348/335 |
| 2004/0095470 A1 * | 5/2004 | Tecu et al. | 348/207.99 |

FOREIGN PATENT DOCUMENTS

| | | | |
|---|---|---|---|
| JP | 11261868 A | * | 9/1999 |

OTHER PUBLICATIONS

Kannala et al.; "A Generic Camera Calibration Method for Fish-Eye Lenses"; Proceedings of the 17th International Conference on Pattern Recognition; Aug. 23-26, 2004; vol. 1; pp. 10-13.*

Brauer-Burchardt et al.; "A New Algorithm to Correct Fish-Eye and Strong Wife-Angle Lens Distortion from Single Images"; 2001 International Conference on Image Processing; Oct. 7-10, 2001; vol. 1, pp. 225-228.*

Basu et al.; "Modeling Fish-Eye Lenses"; Proceedings of the 1993 IEEE/RSJ International Conference on Intelligent Robots and Systems; Jul. 26-30, 1993; pp. 18221828.*

Shah et al.; "A Simple Calibration Procedure for Fish-Eye (High Distortion) Lens Camera"; 1994 IEEE International Conference on Robotics and Automation; May 8-13, 1994; vol. 4, pp. 3422-3427.*

IEEE Journal of Robotics and Automation, vol. RA-3, No. 4, Aug. 1987, Roger Y. Tsai, A Versatile Camera Calibration Technique for High-Accuracy 3D Machine Vision Metrology Using Off-The-Shelf TV Cameras and Lenses, pp. 323-344.

* cited by examiner

METHOD FOR EXPLORING VIEWPOINT AND FOCAL LENGTH OF CAMERA

BACKGROUND OF THE INVENTION

1. Field of Invention

The present invention relates to a method for processing and showing digital images. More specifically, the invention is a method for restoring distortive images to normal ones by means of finding out the viewpoint and focal length of a lens in a camera.

2. Related Art

The imaging principle of cameras described by general optical theory is mostly built on hypotheses of a rectilinear projection model. A camera with a similar kind of lens usually can get image pictures close to normal reality. But there is a drawback—the field of view (FOV) is small. For instance, the FOV of standard lenses is around 45 degrees to 55 degrees. It enables some devices that need a broad FOV, like surveillance or endoscopes etc., to use wide-angle lens or fisheye lens (FEL) in order to capture pictures with a big FOV with every single shot.

The FEL is used to capture extremely wide-angled images. Usually, a fisheye lens camera (FELC) can take 180 degrees or more without moving or rotating the camera itself. Coming with the increase of the angle of view, there is also a severe problem of distortion in the captured images. Thus, it is necessary to come out with a calibration method in order to obtain images that are close to reality. The level of accuracy of the calibration method attained determines what fields the FELC can be applied. For instance, if the surveillance systems only need to see where people or things are, they can tolerate a partial distortion in images. If the purpose is taking pictures for virtual reality (VR), it is also acceptable that images "look like" normal ones. However, if our purpose involves 3-D image metering, such as stereoscopic or autonomous robotic vision, it is difficult to obtain accurate 3-D positions of images from reality in situations that some cubical optical parameters of the FEL are unknown.

However, for customers, the kind of lens that has the advantages of wide-angled views and showing image in clarity as well as the capability of metering accurately will be very competitive and attractive. Moreover, with the excellent characteristic of a nearly infinite view depth, it is a point that other kinds of lenses are scarcely comparable to the fisheye lens. If the imaged distortion isn't counted, the fisheye lens is superior to other kinds of lenses. Thus, for expanding the applied fields, how to calibrate the distortive images of the FEL is vitally important.

Currently, there are many calibration methods have been advanced. R. Y. Tasi [1987] (Tsai, "A versatile camera calibration technique for high-accuracy 3D machine vision metrology using off-the-shelf TV camera and lenses", IEEE Journal of Robotics and Automation, Vol. RA-3, No 4, August, 1987, pp 323–344) employs five non-coplanar points of known absolute coordinates in viewing space and transfers them by a rotation matrix and a translation matrix to gain the viewpoint and the focal length of a normal lens. The result from Tasi's model is pretty accurate. But its demonstration also is based on the hypothesis of rectilinear projection; it will involve a large error under a severely nonlinear projection system like the FEL. For the purposes of calibrating the FEL, Tasi's model seems not to be a common choice. Thereafter, there is a simple calibration method aimed at the FEL. With reference to FIG. 1A and FIG. 1B, wherein FIG. 1B is a cubical projection of FIG. 1A, it is assumed that the image plane 1 is an ellipse (or a circle), and the intersection point 13 of its major axis 11 and minor axis 12 is exactly the image center (the point C on both the figures). In addition, it is also assumed that the FOV taken by the FEL is exactly 180 degrees. On the premised basis, it is deduced that the periphery of the imaged area has a zenithal angle of $\pi/2$, the one on the distortion center 13 has an angle of 0, and the others are determined by the relative location between the point C 13 and the periphery. For example, the point A in FIG. 1A corresponds to the point A' in FIG. 1B. The method of calibration described above is simple and needs no calibration target to assist. Nevertheless, its premises are not really correct. First, the center point 13 on the obtained picture perhaps is not the real image center. Next, the periphery of an image taken by the FEL is usually blurred, so it is difficult to correctly decide where the imaged boundary exactly lies. Accordingly, the fidelity of the calibrated image is not verifiable. Obviously, this image-based model of analysis cannot be used appropriately in the domain of 3-D metering.

With regard to the patents, TeleBobotic International Inc. has disclosed several technologies regarding the FEL, such as the U.S. Pat. Nos. 5,185,667, 5,313,306, 5,359,363 and 5,384,588. Overall, the contents of the technologies are described as following: a hemispheric FOV is shot by a FELC without moving or rotating the camera, utilizing a dedicated electronic circuit controlled by a computer to digitally transfer the original distortive images into normal perspective ones and show them in a display. The technologies are indicated to apply in the fields of orientation, surveillance, endoscopes, remote control, etc. Subsequently, according to TeleBobotic's disclosure, Interactive Pictures Corporation further brought up a serial of new inventions, such as the U.S. Pat. Nos. 5,764,276, 5,877,801, 5,903,319, 5,990,941, 6,002,430, 6,147,709 and 6,201,574 B1. But no matter whichever above all employs a same projection mode to calibrate images. They do not really find out the viewpoint and the focal length the parameters of the FEL, and consider that the same projection mechanism shown in FIG. 1A and FIG. 1B, the equidistant projection (EDP) model. Within the indistinct situations of the exact optical projective mechanism, the present technologies are only for extending and restoring original images but not improve on accuracy. Applications in the field of 3-D image metering would still be restricted.

In the projective models, besides the EDP there are other FEL projection modes known to those skilled in the art—stereographic projection and orthographic projection (often called an equisolid angle projection). Their respective formulas are presented separately as following:

1. Equidistant projection: $IH=f\theta$
2. Stereographic projection: $IH=2f\times\tan(\theta/2)$
3. Orthographic projection: $IH=f\times\sin\theta$ where, IH: the distance from an imaged point to the optic axis of a lens (also called the image height)

f: the effective focal length of the FEL $\theta$: the incident angle in the focal plane, being named the zenithal angle if the optical axis is upward as shown in FIG. 1B.

Theoretically, the stereographic projection is the best, but the equidistant form is a normally given type that is easier to produce. Therefore, most of the current calibration methods have a postulation that almost all projection modes of the FEL are equidistant projection. Basically, it is not certain.

On the other hand, although lenses are usually designed in a specific projective mechanism, after being made it is difficult to verify whether they match the desired specification or not. Furthermore, when the FEL is installed into a real system (such as a camera), its optical parameters such as the effective focal length and the imaged visual angle probably vary accordingly. For this reason, if a simple and common technology is developed, which can verify the optical characteristics of the fabricated devices being produced, to provide a guarantee of quality for the product during sale, it would greatly raise the value.

It is a standpoint to those skilled in the art of the rectilinear projection; the FEL is treated as no "real viewpoint". However, if the corresponding projection mode can be classified and the focal length can be discovered, it can not only calibrate distortion but also be applied in the field of 3-D metering and in the quality control or the specification verification of the deployed products.

SUMMARY OF THE INVENTION

In view of the foregoing, it is an object of this invention to provide an essentially solving method for modeling a severe non-linear projection mechanism such as a fisheye lens (FEL) based on appraising the inherent projection model of the lens.

Another object of this invention is to explore the viewpoint (also termed the front nodal point in the traditional optically modeling) and the effective focal length of the fisheye lens camera (FELC) so as to employ it in the field of 3-D application.

A further object of this invention is to provide a method for parameterizing or verifying the optical characteristic of a FEL or related devices to control the quality of products before deploying.

Pursuant to the above objects, the present invention provides a method for exploring the viewpoint and the focal length of the FELC. First, put a calibration target with a specific test pattern in the field of view (FOV) of the FELC. Adjust the position of the calibration target (or of the FELC) to make its corresponding image have a geometric figure according to some predicted features. At this moment, both the centers of the test pattern and the corresponding image are connected to locate the optic axis of the FEL. Thereafter, a pinpoint will be searched out along the optic axis to enable the image height and the corresponding physical zenithal angle fit in with a specific projection model. The projection model could be one of an equidistant projection, a stereographic projection or an orthographic projection, being the well-known projection modes of the FEL. Accordingly, the located pinpoint will be the viewpoint of the FELC and then the effective focal length will be acquired through the obtained projective formula.

The present invention has the ability to find out the viewpoint, the effective focal length and its inherent projection model. Therefore, it can not only calibrate distortion and find out the projection mechanism but can also be applied in the quality verification of products and, further, in setting up a versatile 3-D metering applications with a larger view angle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and thus are not limitative of the present invention, and wherein.

In the various drawings, the same references relate to the same elements.

DETAILED DESCRIPTION OF THE INVENTION

There is severe deformation in images projected from an axis-symmetrical nonlinear-distortive lens such as the fisheye lens (FEL). Nevertheless, the distortive phenomenon has the following characteristics: the distortion is axially symmetric in viewing space and center symmetric in the imaged plane. These are well-known to those skilled in the art. The present invention first takes advantage of the characteristics to locate the optic axis of the FEL. With the reference to the optic axis then, further find out the viewpoint of the FEL and figure out the focal length by a dedicated projection mode.

Figure 1A:
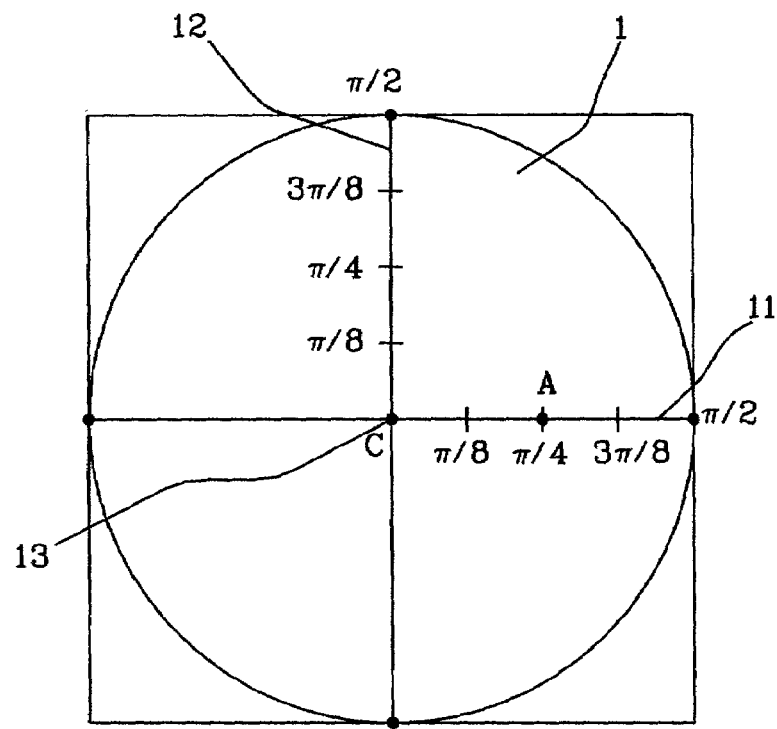
FIG. 1A and FIG. 1B show a schematic view of a related-art calibration method for a FEL's image.
Figure 1B:
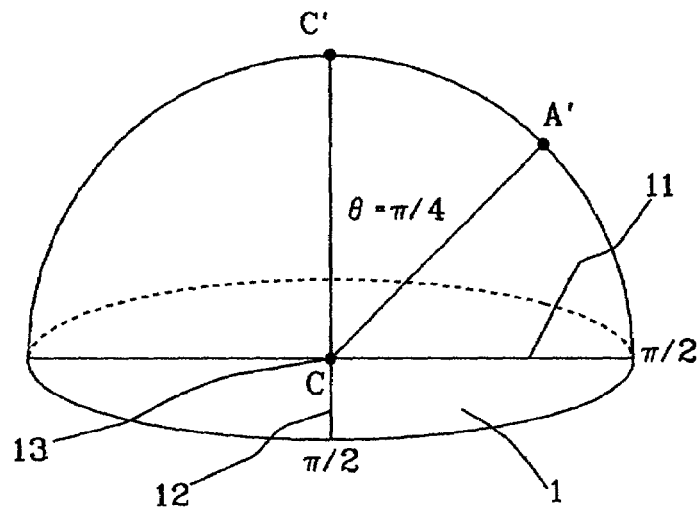
Figure 2:
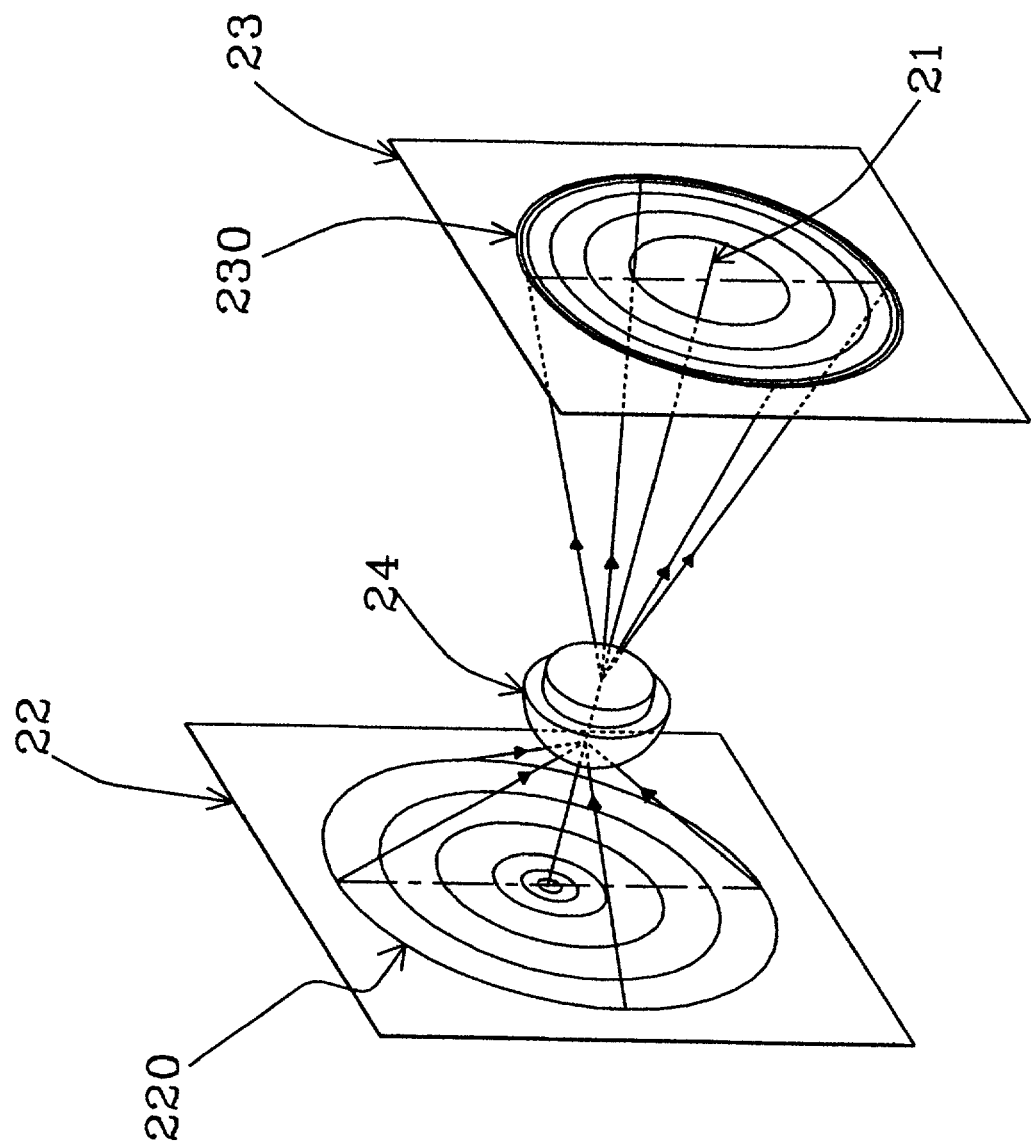
FIG. 2 shows a schematic view of an optical path about locating the optic axis of the FEL in the invention.

Referring to FIG. 2, a calibration target 22 should be used to practice the method of the invention. The calibration target 22 provides at least one flat plane. In locating the optic axis, there is at least one geometric figure on the flat plane of the calibration target 22. If there are plural ones, they must be homocentric and symmetric, like the concentric circles shown in FIG. 2, totally called test pattern 220. While the calibration is proceeding, the calibration target 22 is put in the field of view (FOV) of the fisheye lens camera (FELC). At this moment the test pattern 220 forms a corresponding image 230 on an image plane 23 behind the FEL 24. According to the characteristics of axial symmetric and center symmetric distortion, if and only if the test pattern 220 is paralleled with the image plane 23 and the optic axis 21 of the FEL 24 passes through their centers, the image 230 will be similar to the concentric circles although it is also distorted. Hence, the position of the calibration target 22 is adjusted until the image 230 is exactly composed of concentric circles. Then both the centers of the test pattern 220 and the image 230 are connected to locate the optic axis 21 of the FEL 24.

Figure 3A:
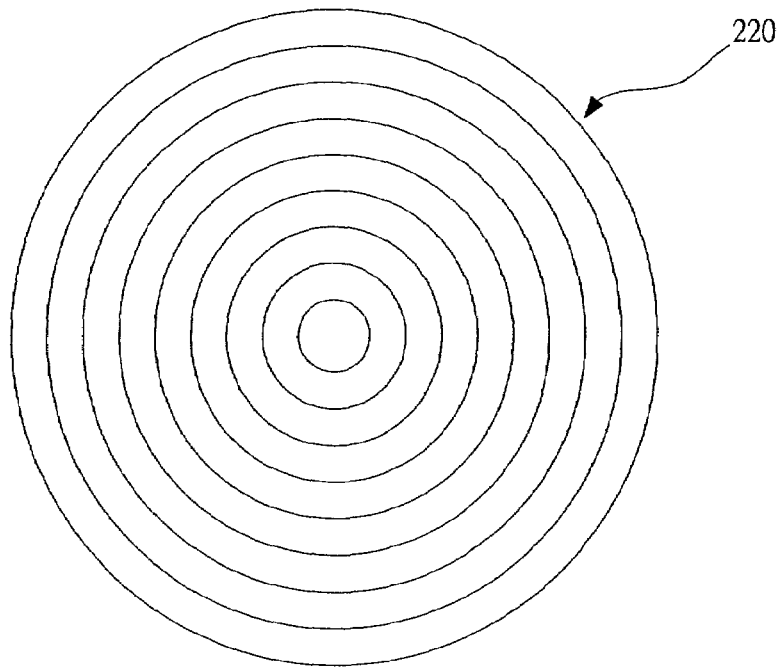
FIG. 3A through FIG. 3D show a schematic view of four embodiments of the test pattern in the calibration target.
Figure 3B:
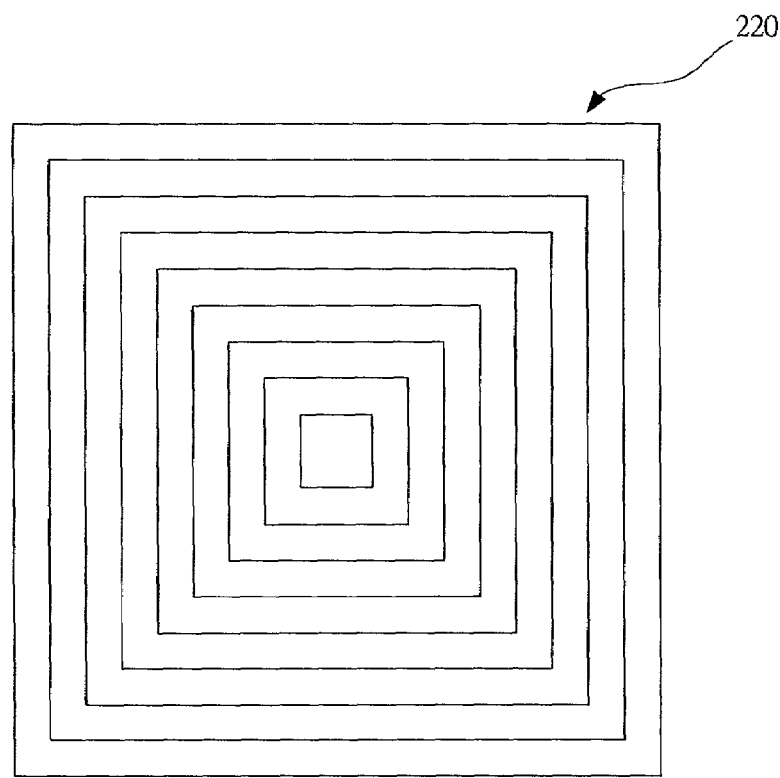
Figure 3C:
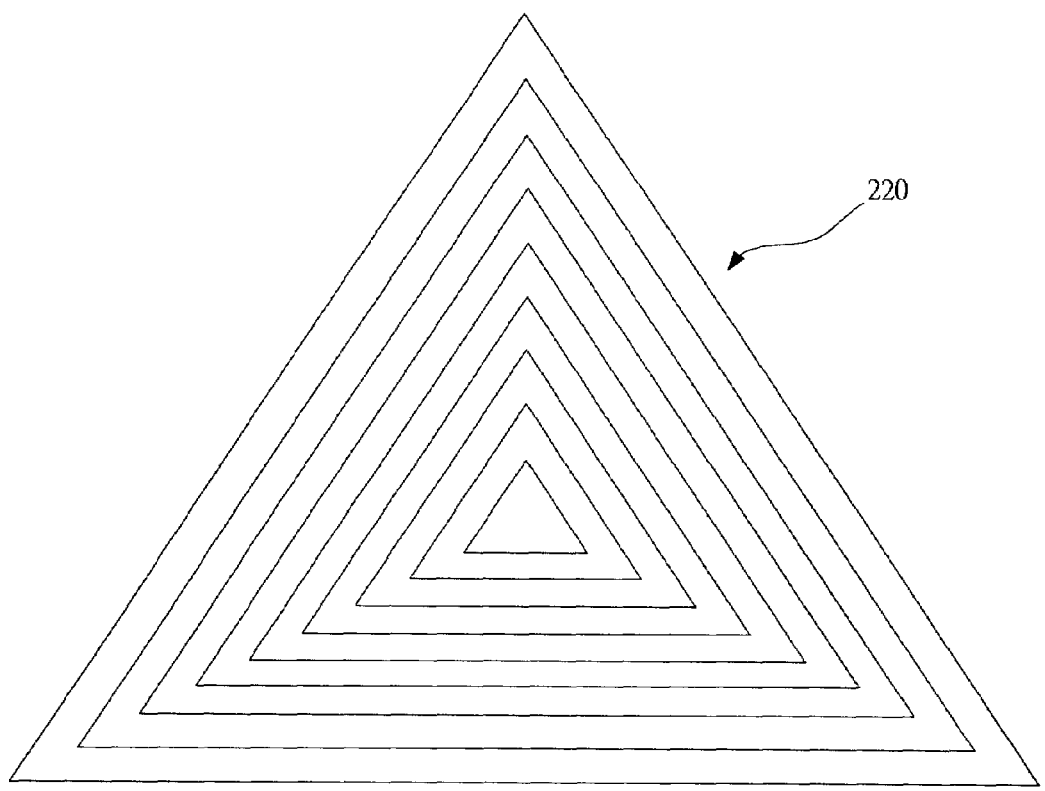
Figure 3D:
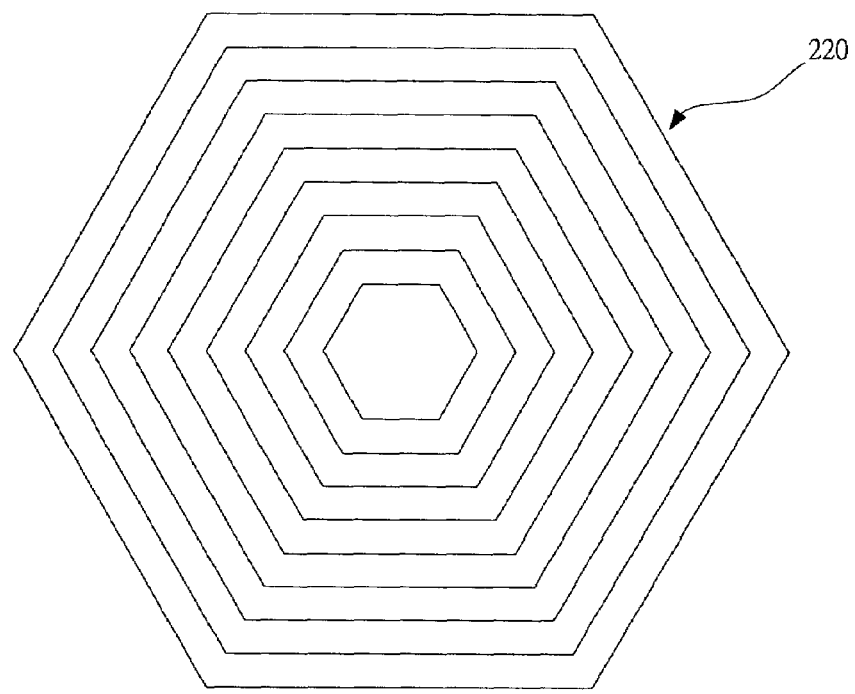

There are many kinds of the test pattern 220 which can be employed in the invention, not only the concentric circles shown in FIG. 3A. It will be a better embodiment for the test pattern 220 to be composed of homocentric and symmetric figures. In addition to the concentric circles, the concentric rectangles shown in FIG. 3B, the concentric triangles shown in FIG. 3C or the concentric hexagons shown in FIG. 3D are all applicable in the invention. Even the combination of any number of circles, rectangles, triangles and polygons will be a possible embodiment of the test pattern 220 in the invention. Considering the barrel distortion of the image 230, in addition to circles, it is necessary to set up featured coordinates on the angles of the figures, such as rectangles or triangles, to be the references during calibration.

Figure 4:
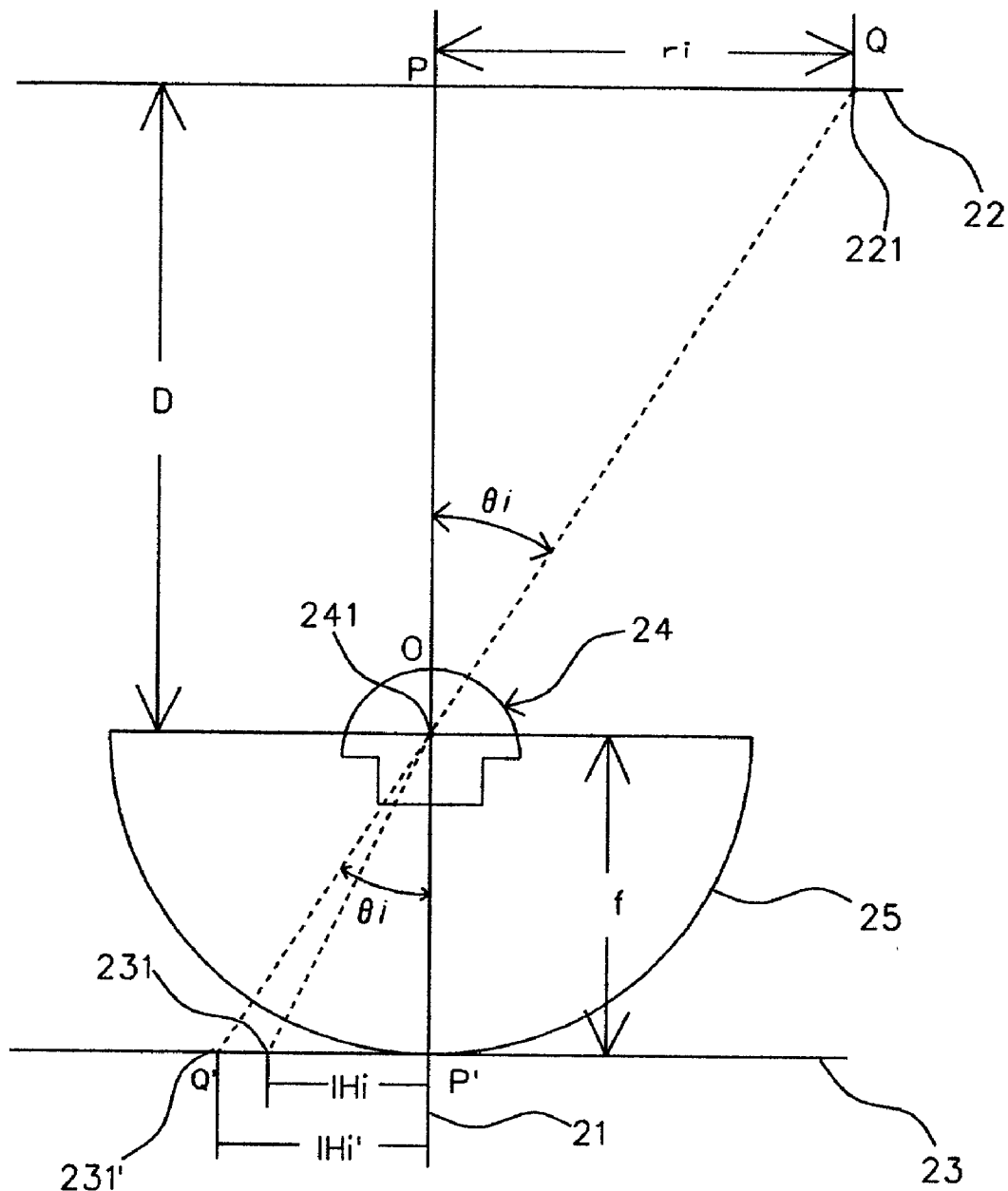
FIG. 4 shows a schematic view of an optical path to point out the viewpoint and the effective focal length with a sampling of the equidistant projection.

Referring to FIG. 4, after the optic axis 21 of the FEL 24 being showed up, the viewpoint if there is one must be a certain point on the optic axis 21 based on the optics theory, and it is frequently inside the FEL 24. It means that the possible range of the viewpoint is limited substantially. Hence, every point on the optic axis 21 is tested one by one through trial and error to find out the viewpoint of the FEL 24. The method of testing also utilizes the test pattern 220 on the calibration target 22. Taking an equidistant projection mode as an example, if a pinpoint 241 on the optic axis 21 is determined as being the viewpoint, the zenithal angle $\theta_i$, which is the extent between the incident rays of sight and the optic axis 21, and the distance $IH_i$ (also called the image height), which is the distance from the image point 231 corresponded with the object point 221 to the optic axis 21 (also the center of the image), are measurable. Having the data of $\theta_i$ and $IH_i$ of each concentric circle can further get $f_i$ value by $\theta_i$ dividing $IH_i$. While the projective behavior of the camera totally fits in with the equidistant projection model, the $f_i$ value is a constant.

When the invention is put into practice, the utilized test pattern 220 is a planar graph of twenty concentric circles, each separated by a constant five-mm radial distance around a central blob. For descriptive purposes, the coordinate system of FIG. 4 is declared as setting the origin at the perpendicular intersection point of the center of the calibration target 22 and the optic axis 21. Thus, the viewpoint must be on the optic axis, being denoted as $(0,0,z)$, where z is a real number. Supposed the distance between the viewpoint and the calibration target 22 is D, and setting the radius of each concentric circle is $r_i$, each corresponding to an image height $IH_i$. Since both $IH_i$ and $\theta_i$ are functions of D, the equidistant projection can be rearranged as $IH_i(D)=f\theta_i(D)$, where i=1~20. Taking $IH_{20}(D)=f\theta_{20}(D)$ as reference, the relationship with each another radius is given by:

$$IH_i(D)/IH_{20}(D) - \theta_i(D)/\theta_{20}(D) = 0$$

If $(0, 0, D)$ is replaced by a free point on the optic axis 21, an error relationship is given by:

$$e_i(z) = IH_i(D)/IH_{20}(D) - \theta_i(z)/\theta_{20}(z)$$

According to the relationship, the object distance D can be fixed at the minimum of $e_i(z)$ if there is only one.

However, the relationship described above is just a result of picking up two concentric circles. In order to cover the overall effective FOV of the camera and consider that there is a respective nonlinear radial extension of imaging circles so that the effective imaged radius extended by each imaged contour is different, For the reasonable processing, a weight function is defined as $w_i(D)=(IH_i(D)-IH_{i-1}(D))/IH_{20}(D)$, where $IH_0(D)=0$, to deal fairly with each effect of the tracks on the image plane 23. Thus, the matching error profile along the optic axis 21 is:

$$\varepsilon(z) = \sum_{i=1}^{20} abs(e_i(z) \times w_i(D))$$

where z is the distant of a free point on the optic axis 21 from the test target 220 toward the FEL 24. The viewpoint is located at where the $\varepsilon(z)$ is minimum or zero. To obtain the focal length f, the measured $IH_i(D)$ and the respective $\theta_i(D)$ are based to get:

$$f(D) = \sum_{i=1}^{20} f_i(D) \times w_i(D)$$

where $f_i(D)=IH_i(D)/\theta_i(D)$. In the optical modeling, the $f(D)$, the $f_i(D)$ and the f are equal to the inherent focal length of the FEL if there is no error in measurement, and D value is inferred accurately. Putting in practice, by the descriptive statistic to analyze the standard deviation of $f_i(D)$ can evaluate the accuracy of the projection model. Namely, the following equation can be as an index to qualify the fitness with the equidistant projection model:

$$\sigma(D) = \left(\sum_{i=1}^{20} (f_i(D) - f(D))^2\right) / (20-1)$$

Figure 5:
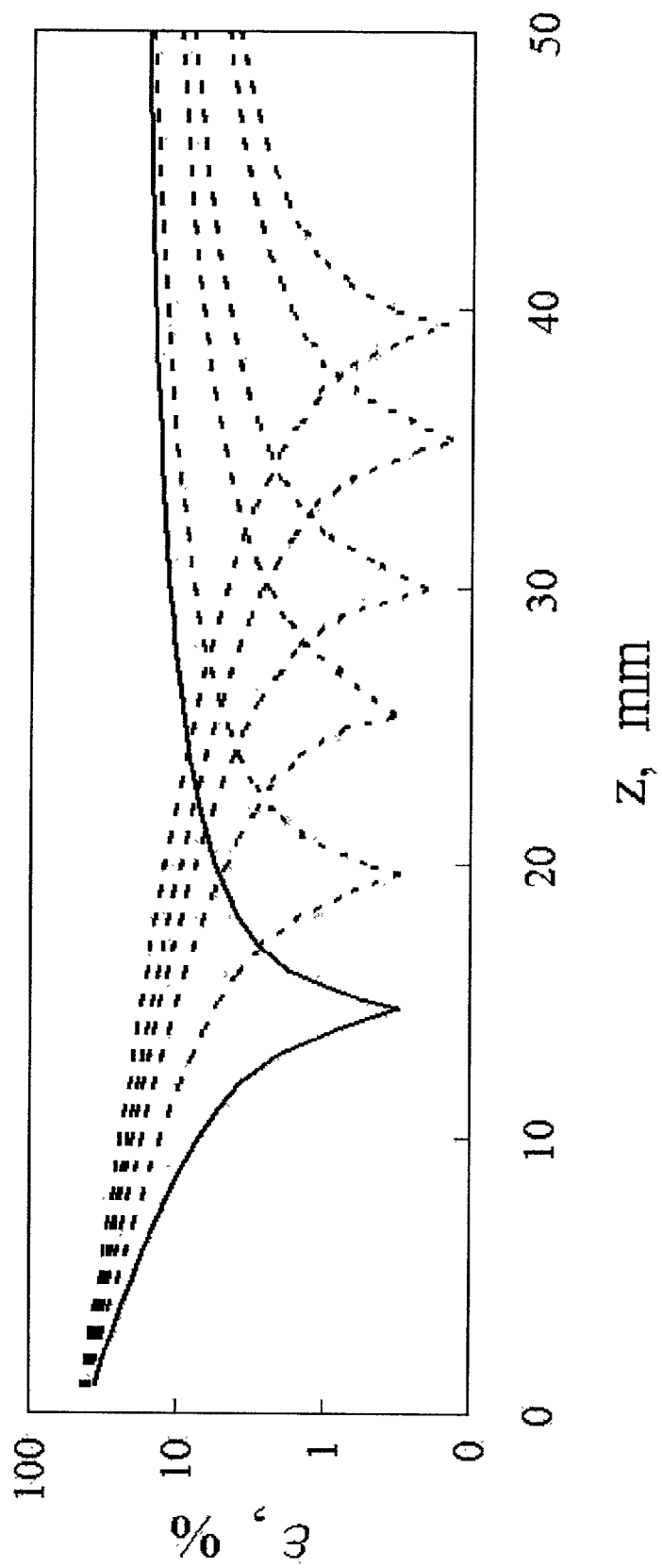
FIG. 5 shows an approaching curve while the invention is practically tested for seeking the viewpoint.

Referring to FIG. 5, which shows some matching profiles while searching for D value along the located optical axis of a tested FELC that is composed of a board camera (Type BV-7112, by Appro Tech. Co., Taiwan) installing a fisheye lens having the focal length of 1.78 mm and 170 degrees diagonal angle of view (Type DW9813, by Daiwon Optical Co., Korea). The solid line in the figure is the profiles of the matching errors respecting an unknown offset from the test target 22. After processing, the inferred objective distance is 14.7 mm. Referring to the obtained location (i.e. DD=0 mm), the invention further moves the calibration target 22 separately forward 5 times each with increasing offset of 5 mm to proceed the same tests. Their respective error profiles are the dashed traces in the figure. These curves reveal very obvious minimums under the six testing to locate the viewpoints or the objective distances Respectively, the manipulated parameters and results obtained from the six tests are shown in Table 1.

TABLE 1 the parameters and results of tests in the invention

| DD | 0.0 | 5.0 | 10.0 | 15.0 | 20.0 | 25 |
|---|---|---|---|---|---|---|
| D | 14.7 | 19.6 | 25.2 | 30.0 | 35.3 | 39.5 |
| f(D) | 1.805 | 1.788 | 1.827 | 1.796 | 1.798 | 1.784 |
| σ (D) | 0.005 | 0.002 | 0.0091 | 0.0058 | 0.0062 | 0.0052 |

(unit:mm)

Looking at the data in Table 1, wherever the calibration target 22 is located in the six separated relative locations denoted as DD shown on row 1; the objective distances inferred by the minimum errors profiles are denoted as D, being shown on the 2nd row. In the model of this invention, the sibling offsets must be a constant of 5.0 mm. The measured data demonstrates that the deviation in each test isn't proportional increasing when the objective distance is changed. For instance, the relative deviation of last column is 0.2 mm (i.e. 25.0 mm to 24.8 mm) and the one in column 4 is 0.3 mm (i.e. 15.0 mm to 14.7 mm). Therefore, these errors could be interpreted as a random process in the experiments. Further, the linearity of the objective offsets proves the uniqueness of the viewpoint. After located the viewpoint, the projective formula is based to derive the focal lengths. These values are shown on row 3. Note, the height of the CCD cell in the camera is based to absolutely scale the f(D) accordingly. The values of the (f(D)±σ(D)) are close and each σ(D) is pretty small. These measured data and the parameterized values reveal that the method of the invention has an excellent accuracy and precision.

Image calibration of the FELC will be extremely easy when the viewpoint and focal length of the FELC are disclosed. To the usual art, there is no constant focal length if the image of a FEL is interpreted in the way of a rectilinear projection. Nevertheless, if examined alternatively, the imaging is modally analytical and the barrel deformation is a natural phenomenon. Referring to FIG. 4 again and taking the same example of an equidistant projection, the projective mechanism can be read as having a specific property that the incident rays doesn't refract on the viewpoint (or the perspective point on the focal plane) but on the surface of a hemisphere defined by the effective focal length. It means that the imaged point 231, which is mapped from the point 221 on the test target 22, defines a zenithal angle $\theta_i$ on the rays of sight in the viewed hemispheres, directly shines upon on the spherical surface 25 with the radius of the effective focal length in other hemisphere, and the length of the corresponding arc is exactly the height of the image point 231 on the image plane 23. Therefore, when the viewpoint and the focal length of the FELC are fixed, based on $\theta$=IH/f, the zenithal angle $\theta$ of each image point 231 is accordingly obtained, and put it into the formula of IH'=f×tan $\theta$ to get the corrected IH' of the image point 231'. Similar arguments are directly adapted to the FEL of other projective models, except that the corresponding objectively imaged lengths are scaled by their respective projective formulae.

This invention is also capable of examining or classifying the projective model of a FELC. If the various projective formulae are applied to derive the respected viewpoints and the focal lengths at the relative different objective offset, the consistent of the obtained values in parameterizing the test camera will enable the distinguishing process. Therefore, the method of exploring the viewpoint and the focal length in the invention is applied not only in the camera whose lens fits in with an equidistant projection, but also the ones with a stereographic projection ($IH_i$=2f×tan($\theta_i$/2)) or an orthographic projection ($IH_i$=f×sin $\theta_i$); Further, to the one with a specific nonlinear projective model. Accordingly, the invention has ability to classify or verify the inherent projection model of the cameras. As to the camera applied in the invention, it could be a CCD camera, a CMOS camera, a digital camera or a traditional camera with film.

Figure 6:
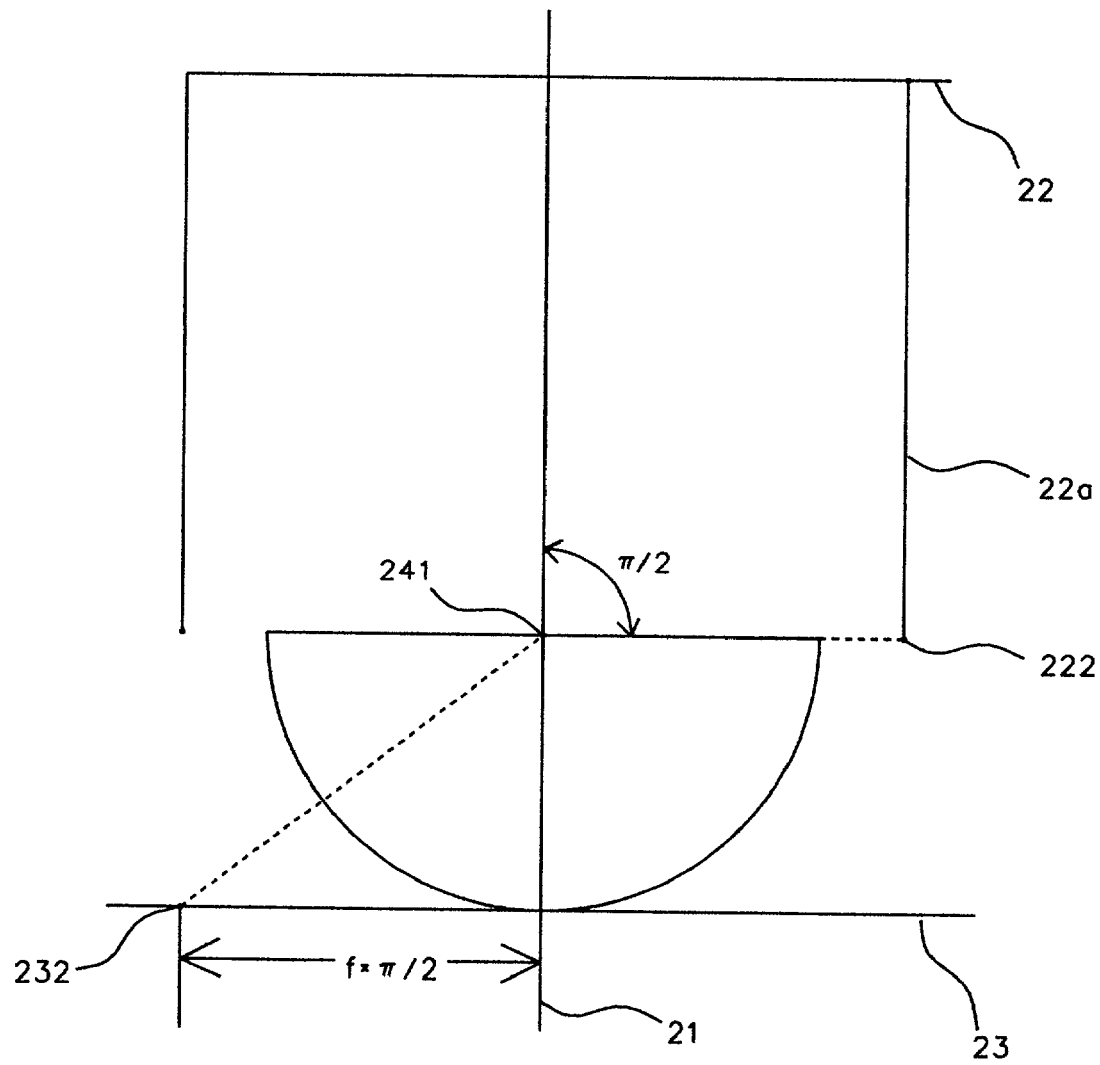
FIG. 6 shows another embodiment of the calibration target which can do with a visual angle greater than 180 degrees.

A FEL normally owns a hemispherical FOV. It is impossible to reach such wide view angle under the planar calibration target 22 described above. As for solving the problem, the embolism can also provide the extension. Referring to FIG. 6, it will be done by vertically extending a cylindrical surface 22a from the periphery of the flat plane to turn the calibration target 22 into a hollow and one-side-open shape like a cubical cylinder or a generally axis-symmetrical physical extension. FIG. 6 being denoted as an azimuthal cut, the cylinder's bottom is drawn a center-referred concentric schema as pre-describing for posing the camera in distance D. The surrounding surface 22a with D offset from the planar target 22 reaches the horizon of the FEL. Then, as on FIG. 6, the object point 222 on the side of the viewpoint 241 has a view angle of 180 degrees, and the corresponding image point 232 is exactly on the boundary of 180 degrees of the image. This extension can service lens with a view angle larger than 180 degrees.

Because the invention has the ability to find out the viewpoint and the focal length of the camera, 3-D metering (also stereoscope) can be truly realized by two sets of FELC. As to the method of triangularly cubical posing, it is well known to those skilled in the art, hence it is not necessary to having a detailed description here. However, the invention has the excellent ability of rapidly getting the incident angle on the focal plane from the "so-called" distortive image height by the inherent native projection formula. It can reduce tons of processing steps in comparison to the methods in related art by approaching from the rectilinear projective model, which uses a nonlinear polynomial function to calibrate the obtained image height to fit in with the rectilinear projection, then through the inverse-tangent function of the effective focal length to derive the incident angle. Because the incident angle is a necessary step for 3-D metering; the invention has an absolutely advantageous superiority in modeling the kind of severe distortion mechanism such as the FEL by its inherent projection model.

Overall, the invention has the following advantages:
1. The capability of finding out the viewpoint and the focal length of the lens in the camera, so the distortive images can be recovered to normal ones within a central perspective mechanism.
2. The inherent projection model of the lens can be classified and ensured.
3. 3-D metering can be truly realized by the invention and the objective incident angle can be got by an easier speedy way.
4. The calibration method is simple and low-cost. It is suitable to parameterize or verify the camera with a FEL or any kind of nonlinear projection mechanism.

The invention being thus described, it will be obvious that the same technique may be varied in many ways. Such variations are not to be regarded as a departure from the spirit and scope of the invention, and all such modifications as would be obvious to one skilled in the art are intended to be included within the scope of the following claims.

What is claimed is:

1. A method for exploring viewpoint and focal length of camera that has an axis-symmetrical nonlinear-distortive lens, the method comprises:
   providing a calibration target with a test pattern composed of at least one geometric figure;
   aiming the center of the test pattern at an optic axis of a lens in the camera; and
   searching a pinpoint along the optic axis to enable at least one image height on an image plane which is related to the geometric figure and the corresponding zenithal angle between the incident rays of light and the optic axis both fit in with a projection model.

2. The method according to claim 1, wherein the geometric figure is selected from the group comprising a circle, a rectangle, a triangle and a polygon.

3. The method according to claim 1, wherein there is a plurality of the geometric figures composed of concentric circles, concentric rectangles, concentric triangles or concentric polygons.

4. The method according to claim 1, wherein the optic axis is further located by the steps comprise:
   placing the calibration target in the field of view of the camera to let the test pattern form a corresponding image on the image plane; and
   changing the position of the calibration target to make the image similar to the test pattern, then connecting both the centers of the calibration target and the image to locate the optic axis.

5. The method according to claim 1, wherein the lens in the camera is a fisheye lens.

6. The method according to claim 1, wherein the lens is a nonlinear lens with a given projection model.

7. The method according to claim 1, wherein the projection model is selected from the group comprising an equidistant projection, an orthographic projection and a stereographic projection.

8. The method according to claim 1, wherein the pinpoint is the viewpoint of the lens in the camera.

9. The method according to claim 1, wherein the calibration target has at least one flat plane to provide the test pattern.

10. The method according to claim 8, wherein the periphery of the flat plane further vertically extends a surface to turn the calibration target into a hollow and one-side-open shape.

11. The method according to claim 1, wherein the camera is selected from the group comprising a CCD camera, a CMOS camera, a digital camera and a traditional camera with film.

12. A method for exploring viewpoint and focal length of camera that has an axis-symmetrical nonlinear-distortive lens, the method comprises:
providing a calibration target with a test pattern composed of at least one geometric figure;
placing the calibration target in the field of view of the camera to let the test pattern form a corresponding image on an image plane;
changing the position of the calibration target to make the image similar to the test pattern, then connecting both the centers of the calibration target and the image to locate an optic axis; and
searching a pinpoint along the optic axis to enable at least one image height on the image plane which is related to the geometric figure and the corresponding zenithal angle between the incident rays of light and the optic axis both fit in with a projection model.

13. The method according to claim 12, wherein the geometric figure is selected from the group comprising a circle, a rectangle, a square, a triangle and a polygon.

14. The method according to claim 12, wherein there is a plurality of the geometric figures composed of concentric circles, concentric rectangles, concentric triangle or concentric polygons.

15. The method according to claim 12, wherein the lens in the camera is a fisheye lens.

16. The method according to claim 12, wherein the lens is a nonlinear lens with a given projection model.

17. The method according to claim 12, wherein the projection model is selected from the group comprising an equidistant projection, an orthographic projection and a stereographic projection.

18. The method according to claim 12, wherein the pinpoint is the viewpoint of the lens in the camera.

19. The method according to claim 12, wherein the calibration target has at least one flat plane to provide the test pattern.

20. The method according to claim 12, wherein the periphery of the flat plane further vertically extends a surrounding surface to turn the calibration target into a hollow and one-side-open shape.

21. The method according to claim 12, wherein the camera is selected from the group comprising a CCD camera, a CMOS camera, a digital camera and a traditional camera with film.

* * * * *